United States Patent

Yuan

(10) Patent No.: US 7,773,320 B2
(45) Date of Patent: Aug. 10, 2010

(54) LENS MODULE

(75) Inventor: Kun-I Yuan, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/182,340

(22) Filed: Jul. 30, 2008

(65) Prior Publication Data
US 2009/0168203 A1     Jul. 2, 2009

(30) Foreign Application Priority Data
Dec. 27, 2007    (CN) ................... 2007 1 0203435

(51) Int. Cl.
*G02B 7/02* (2006.01)
(52) U.S. Cl. .............. 359/811; 359/819; 359/822
(58) Field of Classification Search ......... 359/649–701, 359/811–822
See application file for complete search history.

(56) References Cited

U.S. PATENT DOCUMENTS 6,590,720 B2 * 7/2003 Oba ....................... 359/819
6,999,159 B2 * 2/2006 Hase ........................ 355/53
7,196,857 B2 * 3/2007 Kazama ................... 359/811
2009/0168191 A1 * 7/2009 Takehisa et al. ........... 359/665

FOREIGN PATENT DOCUMENTS

CN       2624241 Y        7/2004
EP       0165015 A2       12/1985

* cited by examiner

*Primary Examiner*—Mohammed Hasan
(74) *Attorney, Agent, or Firm*—Andrew C. Cheng

(57) ABSTRACT

A lens module includes a barrel, a lens, and a light leveling assembly. The barrel includes an opening, which allows a light to pass therethrough. The lens is accommodated in the barrel. The light leveling assembly is accommodated in the barrel. The light leveling assembly includes a substrate and a film. The substrate has a first surface where the film is disposed and an opposite second surface facing the lens. A thickness of the film is approximately equal to a quarter wavelength of the light. A refractive index of the film exceeds that of the substrate.

17 Claims, 3 Drawing Sheets

LENS MODULE

BACKGROUND

1. Technical Field

The invention relates to optical elements, and particularly to a lens module.

2. Description of Related Art

Currently, with the development of electronic devices providing multiple functions, camera modules have become widely used in a variety of consumer electronic devices such as notebook computers, personal digital assistants (PDAs), cellular phones, and others. There is a corresponding increase in the demand for improved image quality, which essentially depends on the quality of a lens module of the camera module.

Generally, a lens module of a camera module has an opening defined at one end thereof, which allows light to enter. The light passes through a plurality of lenses inside the lens module and then converges on a sensor, such as a charge coupled device (CCD), which generates an image. Due to different distances from a subject to the lens module, angles of incidence of the incoming light vary correspondingly. Because luminous flux is inversely proportional to the angles of incidence, thus uneven brightness of the image will be generated. That is, brightness at the periphery area of the image is reduced as compared with that at the central area.

What is needed, therefore, is a lens module providing even brightness distribution.

SUMMARY

A lens module is provided. In one embodiment, the lens module includes a barrel, at least one lens, and a light leveling assembly. The barrel has an opening, which allows a light to pass therethrough. The lens is accommodated in the barrel. The light leveling assembly is accommodated in the barrel. The light leveling assembly includes a substrate and a film. The substrate has a first surface where the film is disposed and an opposite second surface facing the lens. A thickness of the film is approximately equal to a quarter wavelength of the light. A refractive index of the film exceeds that of the substrate.

Advantages and novel features of the present lens module will become more apparent from the following detailed description of preferred embodiments when taken in conjunction with the accompanying drawings.

BRIEF DESCRIPTION OF THE DRAWINGS

The components in the drawing are not necessarily drawn to scale, the emphasis instead being placed upon clearly illustrating the principles of the present invention.

Figure 1:
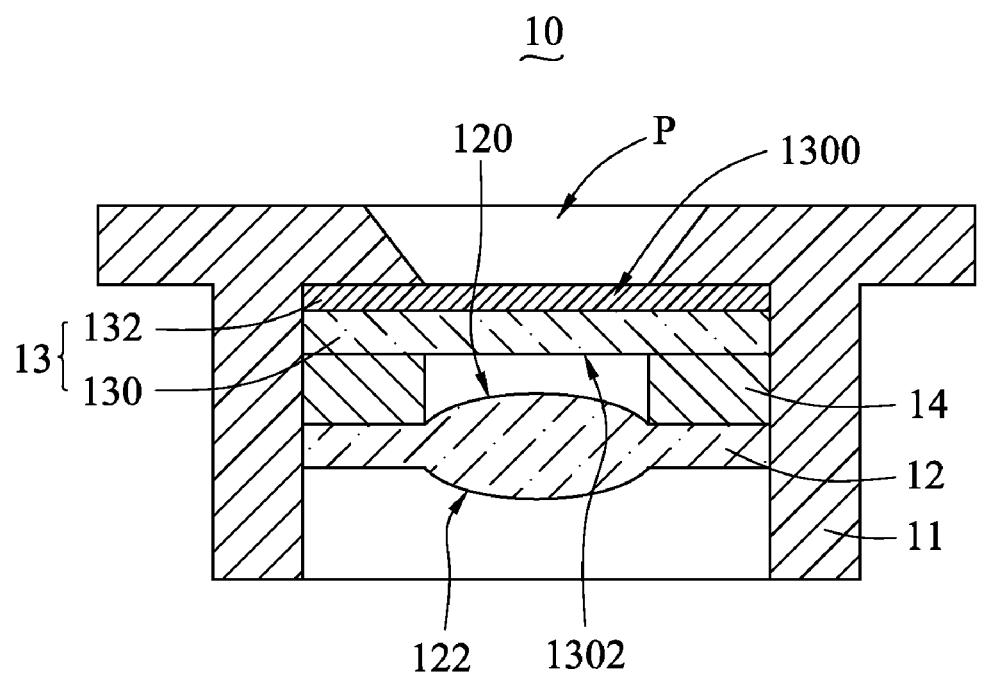
FIG. 1 is a schematic cross-sectional view of a lens module in accordance with an embodiment of the present invention.

Corresponding reference characters indicate corresponding parts throughout the drawings. The exemplifications set out herein illustrate at least one preferred embodiment of the present lens module, in one form, and such exemplifications are not to be construed as limiting the scope of the invention in any manner.

DETAILED DESCRIPTION OF THE EMBODIMENT

Reference will now be made to the drawings to describe embodiments of the present lens module in detail.

Referring to FIG. 1, a lens module 10 in accordance with a present embodiment is shown. The lens module 10 includes a barrel 11, a lens 12 and a light leveling assembly 13. Lens module 10 can be deployed in electronic devices such as notebook computers, personal digital assistants (PDAs), or cellular phones.

The barrel 11 is a cylindrical barrel and can be resin, such as polyethylene, polypropylene, polyvinyl chloride, or polystyrene. The barrel 11 defines an inner space accommodating the lens 12 therein. The inner space has an opening P defined at one end thereof, through which light enters. The light passes through the lens 12 accommodated in the barrel 11 and is captured by a sensor (not shown) disposed at the opposite end of the inner space.

While one lens 12 is here accommodated in the barrel 11, the disclosure is not limited thereto. Advantageously, two or more lenses can be employed to achieve specific optical functions. In this embodiment, the lens 12 is a converging lens converging the light to generate an image of a subject. Moreover, the lens 12 is provided with positive focal power.

Figure 2:
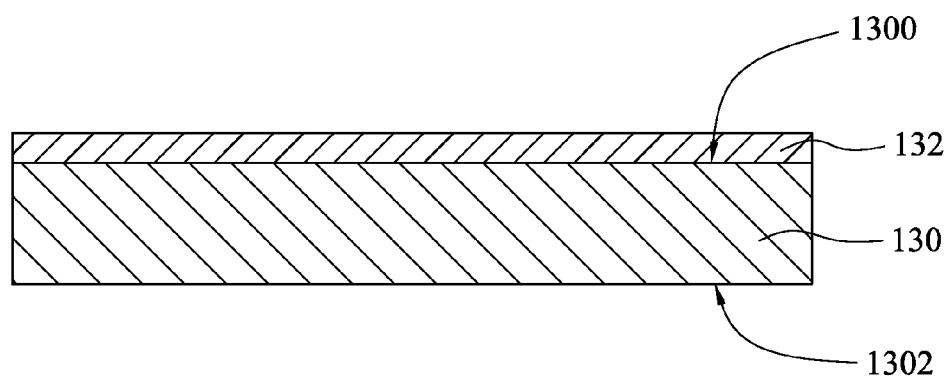
FIG. 2 is an enlarged view of a light leveling element shown in FIG. 1.

Referring to FIG. 1 and FIG. 2, the light leveling assembly 13 is accommodated in the barrel 11 and adjacent to the opening P thereof. The light leveling element 13 includes a substrate 130 and a film 132 deposited on the substrate 130. The substrate 130 has a first surface 1300 and an opposite second surface 1302. The film 132 is disposed on the first surface 1300 of substrate 130. Particularly, the film 132 can be coated on the first surface 1300 of substrate 130. The second surface 1302 of substrate 130 faces the lens 12. In the present embodiment, the substrate 130 is transparent material, such as glass or resin.

In the present embodiment, a thickness of the film 132 is approximately equal to a quarter wavelength of the light. However, if the light is a mixed light with different wavelengths, the thickness of the film 132 can be chosen as one fourth of the average wavelength of the mixed light beam.

The film 132 of the present embodiment has a high refractive index. Specifically, a refractive index of the film 132 exceeds that of the substrate 130. In addition, the refractive index of the film 132 also exceeds than that of air. In the present embodiment, the film 132 is zirconium dioxide ($ZrO_2$), titanium dioxide ($TiO_2$), tantalum pentoxide ($Ta_2O_5$), hafnium oxide ($HfO_2$), or alloy thereof.

The lens module 10 further includes a spacer 14 between the lens 12 and the light leveling assembly 13. The spacer 14 is configured for preventing the light leveling assembly 13 from colliding with the lens 12.

Figure 3:
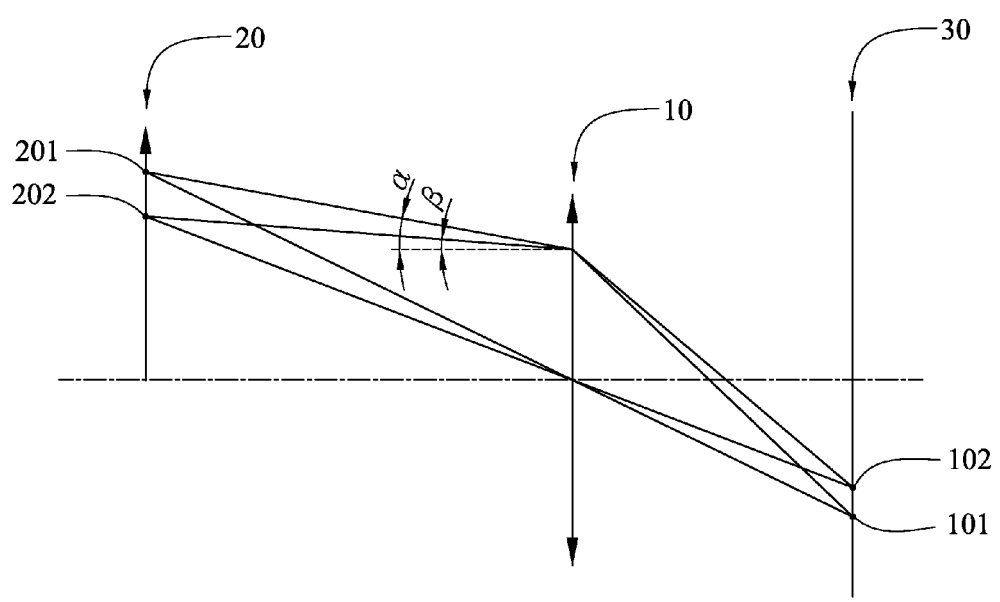
FIG. 3 is a schematic view of an exemplary image capture in the lens module of FIG. 1, showing exemplary optical paths.

FIG. 3 is a schematic view of an image capture of an subject 20. The subject 20 is placed in front of the lens module 10 and an image is formed in an image plane 30 behind the lens module 10. Here, point images 101 and 102 in the image plane 30 represent two positions 201 and 202 of the subject 20, respectively. It is assumed that the light received to form the point images 101, 102 passes through the light leveling assembly 13 with an angle of incidence of $\alpha$ and $\beta$, respectively. In the present embodiment, the angle of incidence $\alpha$ is larger than $\beta$.

Because the film 132 is characterized by a refractive index exceeding that of the substrate 130 or air, a portion of the light incident into the film 132 will be reflected. In addition, the reflective rate of film 132 is inversely proportional to the angle of incidence of light. That is, the reflectivity of film 132 may vary depending on the angle of incidence of light. For example, the amount of light with the angle α of incidence reflected by the film 132 is less than that of light with the angle β of incidence if the light passes through the light leveling assembly 13. That is, the light with the angle of incidence α has higher light transmission to the film 132 than light with the angle of incidence β. As a result, brightness of image over different areas is compensated to be evenly distributed.

In conclusion, by disposing the light leveling assembly in front of the lens, the light passing through the light leveling assembly is distributed uniformly on the image plane. Luminous flux entering the central portion of the lens module and the peripheral region of the lens module is equally adjusted, with image quality improved correspondingly.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A lens module, comprising:
   a barrel comprising an opening allowing incident light to pass therethrough;
   a lens accommodated in the barrel; and
   a light leveling assembly accommodated in the barrel, the light leveling assembly and the lens arranged in that order from the object side to the image side of the lens module, the light leveling assembly comprising a substrate and a film, the substrate having a first surface on which the film is disposed and an opposite second surface facing the lens, with a thickness of the film being substantially equal to a quarter wavelength of the incident light, and a refractive index of the film exceeding that of the substrate.

2. The lens module as claimed in claim 1, wherein the light leveling assembly is disposed adjacent to the opening.

3. The lens module as claimed in claim 1, wherein the substrate is glass or resin.

4. The lens module as claimed in claim 1, wherein the film is selected from the group consisting of zirconium dioxide, titanium dioxide, tantalum pentoxide, hafnium oxide, and alloy thereof.

5. The lens module as claimed in claim 1, wherein the lens is a converging lens.

6. The lens module as claimed in claim 1, wherein the lens has a positive focal power.

7. The lens module as claimed in claim 1, further comprising a spacer disposed between the lens and the light leveling assembly.

8. The lens module as claimed in claim 1, wherein the film is coated on the first surface of the substrate.

9. The lens module as claimed in claim 1, wherein the refractive index of the film exceeds that of air.

10. A lens module, comprising:
    a barrel comprising an opening allowing incident light to pass therethrough;
    a lens accommodated in the barrel; and
    a light leveling assembly accommodated in the barrel, the light leveling assembly comprising a substrate and a film, the substrate having a first surface on which the film is disposed and an opposite second surface facing the lens, with a thickness of the film being substantially equal to a quarter wavelength of the incident light, and a refractive index of the film exceeding that of the substrate, wherein the film is selected from the group consisting of zirconium dioxide, titanium dioxide, tantalum pentoxide, hafnium oxide, and alloy thereof.

11. The lens module as claimed in claim 10, wherein the film is coated on the first surface of the substrate.

12. The lens module as claimed in claim 10, wherein the refractive index of the film exceeds that of air.

13. The lens module as claimed in claim 10, wherein the light leveling assembly is disposed adjacent to the opening.

14. The lens module as claimed in claim 10, wherein the substrate is glass or resin.

15. The lens module as claimed in claim 10, wherein the lens is a converging lens.

16. The lens module as claimed in claim 10, wherein the lens has a positive focal power.

17. The lens module as claimed in claim 10, further comprising a spacer disposed between the at least one lens and the light leveling assembly.

* * * * *